(12) United States Patent
Zhou et al.

(10) Patent No.: US 12,388,143 B2
(45) Date of Patent: Aug. 12, 2025

(54) BATTERY CELL, BATTERY, POWER CONSUMPTION DEVICE AND MANUFACTURING DEVICE AND METHOD FOR BATTERY CELL

(71) Applicant: CONTEMPORARY AMPEREX TECHNOLOGY (HONG KONG) LIMITED, Hong Kong (CN)

(72) Inventors: Wenlin Zhou, Ningde (CN); Xiangyan Bu, Ningde (CN); Quankun Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 694 days.

(21) Appl. No.: 17/544,005

(22) Filed: Dec. 7, 2021

(65) Prior Publication Data

US 2022/0255176 A1 Aug. 11, 2022

Related U.S. Application Data

(63) Continuation of application No. PCT/CN2021/076486, filed on Feb. 10, 2021.

(51) Int. Cl.
*H01M 50/528* (2021.01)
*B60L 50/64* (2019.01)
(Continued)

(52) U.S. Cl.
CPC .......... *H01M 50/249* (2021.01); *B60L 50/64* (2019.02); *H01M 50/204* (2021.01)

(58) Field of Classification Search
None
See application file for complete search history.

(56) References Cited

U.S. PATENT DOCUMENTS 10,658,647 B2 5/2020 Li et al.
2009/0186269 A1 7/2009 Kim et al.
(Continued)

FOREIGN PATENT DOCUMENTS

CN 111490191 A 8/2020
CN 111799402 A 10/2020
EP 3651229 A1 5/2020

OTHER PUBLICATIONS

Extended European Search Report dated Aug. 22, 2022 received in European Patent Application No. EP 21810264.8.

*Primary Examiner* — Tracy M Dove
(74) *Attorney, Agent, or Firm* — Scully, Scott, Murphy & Presser, P.C.

(57) ABSTRACT

An embodiment of the present application provides a battery cell, a battery, a power consumption device, and a manufacturing equipment and method for a battery cell. The battery cell includes a housing, an electrode assembly, an end cover to cover the housing, and an electrode terminal installed on the end cover and electrically connected with the electrode assembly. The end cover includes a first body and a first convex portion, and the first convex portion extends from the first inner surface of the first body along a direction facing the electrode assembly, a position on the first body corresponding to the first convex portion is formed with a first concave portion recessed from the first outer surface opposite to the first inner surface along the direction facing the electrode assembly, the first concave portion is configured to accommodate the electrode terminal. The battery cell can effectively increase the battery capacity.

20 Claims, 7 Drawing Sheets

(51) Int. Cl.
*H01M 50/204* (2021.01)
*H01M 50/249* (2021.01)
*H01M 50/533* (2021.01)

(56) References Cited

U.S. PATENT DOCUMENTS

2019/0067663 A1 2/2019 Li et al.
2020/0144584 A1 5/2020 Zeng et al.
2020/0203699 A1 6/2020 Li et al.

FIG. 14

BATTERY CELL, BATTERY, POWER CONSUMPTION DEVICE AND MANUFACTURING DEVICE AND METHOD FOR BATTERY CELL

CROSS-REFERENCE TO RELATED APPLICATIONS

This application is a continuation of International Application No. PCT/CN2021/076486, filed on Feb. 10, 2021, the disclosure of which is hereby incorporated by reference in its entirety.

TECHNICAL FIELD

The present application relates to the technical field of batteries, and in particular, to a battery cell, a battery, and a power consumption device, and a manufacturing device and method for the battery cell.

BACKGROUND

Currently, the most commonly used batteries in vehicles are lithium-ion batteries. As a kind of rechargeable battery, lithium-ion batteries have the advantages such as small size, high energy density, high power density, multiple cycles of use, and long storage time.

The rechargeable battery includes a housing, an end cover assembly and an electrode assembly. The electrode assembly is located in the housing, and the end cover assembly covers at the housing, to provide a sealed environment for the electrode assembly.

For a general rechargeable battery, a capacity of the battery may be affected by a structure of the battery cell. Therefore, how to improve the capacity of the battery is a technical problem to be solved urgently in the battery technology.

SUMMARY

An embodiment of the present application provides a battery cell, which may effectively improve a capacity of the battery.

In a first aspect, an embodiment of the present application provides a battery cell, including: a housing, including an opening; an electrode assembly, accommodated in the housing; and an end cover assembly, including an end cover and an electrode terminal, the end cover being used for covering at the opening, the electrode terminal being installed on the end cover, and being used for electrical connection with the electrode assembly; where, the end cover includes a first body and a first convex portion, the first body includes a first inner surface and a first outer surface arranged oppositely, and the first convex portion extends to a first end surface from the first inner surface along a direction facing the electrode assembly, a position on the first body corresponding to the first convex portion is formed with a first concave portion recessed from the first outer surface along the direction facing the electrode assembly, the first concave portion is configured to accommodate the electrode terminal, and the electrode terminal is located on a side of the first end surface away from the electrode assembly.

In the above solution, the position on the first body of the end cover corresponding to the first convex portion is formed with the first concave portion recessed from the first outer surface along the direction facing the electrode assembly, the first concave portion may be used for accommodating the electrode terminal, to reduce a length of a part of the electrode terminal protruding from the outside of the first body. Since a position of the first convex portion and a position of the first concave portion are opposite, the first convex portion may recess the first concave portion as much as possible along the direction facing the electrode assembly, further reducing the length of the part of the electrode terminal protruding from the outside of the first body, which may effectively increase the capacity of the battery. In addition, since the electrode terminal is located on the side of the first end surface away from the electrode assembly, that is, the electrode terminal does not exceed the first end surface along the direction facing the electrode assembly, the electrode terminal does not occupy a space inside the housing and may make more space for the electrode assembly in the housing, which is beneficial to improve the capacity of the battery cell.

In some embodiments, a bottom wall of the first concave portion exceeds the first inner surface along the direction facing the electrode assembly; or, the bottom wall of the first concave portion is flush with the first inner surface.

In the above solution, the bottom wall of the first concave portion exceeds the first inner surface along the direction facing the electrode assembly, so that the first concave portion is recessed into the first convex portion, which further increases a recess depth of the first concave portion and further reduces the length of the part of the electrode terminal protruding from the outside of the first body. Of course, the bottom wall of the first concave portion is flush with the first inner surface, which may also increase the recess depth of the first concave portion, to reduce the length of a part of the electrode terminal protruding from the outside of the first body.

In some embodiments, the bottom wall of the first concave portion is provided with a groove recessed along a direction facing the electrode assembly, and the electrode terminal is partially accommodated in the groove.

In the above solution, the arrangement of the groove on the bottom wall of the first concave portion may facilitate positioning and installation of the end cover of the electrode.

In some embodiments, the electrode terminal includes a connection body and a terminal main body, the terminal main body is used for electrical connection with the electrode assembly, and the terminal main body is installed on the end cover through the connection body; where, the connection body is at least partially accommodated in the groove and fixed to a side wall or a bottom wall of the groove.

In the above solution, the terminal main body is used for electrical connection with the electrode assembly, and a function of the terminal main body is to output electric energy of the battery cell. The connection body plays a role to connect the terminal main body and the end cover, and the connection body is at least partially accommodated in the groove and fixed to the side wall or the bottom wall of the groove, so as to fix the terminal main body.

In some embodiments, a depth of the first concave portion is greater than a depth of the groove.

In some embodiments, the end cover is provided with an electrode extraction hole communicating with the first concave portion and penetrating the first end surface, and the electrode terminal covers the electrode extraction hole.

In the above solution, the electrode terminal covers the electrode extraction hole, so that the electrode terminal does not extend into the electrode extraction hole, which facilitates installation of the electrode terminal in the first concave portion.

In some embodiments, the end cover assembly further includes an insulating member; the insulating member is located on a side of the end cover facing the electrode assembly, and the insulating member is used for separating the electrode assembly and the end cover.

In the above solution, the insulating member is located on the side of the end cover facing the electrode assembly. The insulating member plays a role or separating the electrode assembly and the end cover, to reduce a risk of short circuit.

In some embodiments, the insulating member includes a second body and a second concave portion, the second body is located on a side of the first body facing the electrode assembly, the second body includes a second inner surface and a second outer surface arranged oppositely, the second concave portion is recessed from the second outer surface along a direction facing the electrode assembly, and the second concave portion is configured to accommodate the first convex portion.

In the above solution, the second concave portion of the insulating member may accommodate the first convex portion of the end cover, which may reduce a distance between the first body and the second body, so as to make more space for the electrode assembly, which is beneficial to improve the capacity of the battery cell.

In some embodiments, the second outer surface abuts against the first inner surface.

In the above solution, the second outer surface of the second body abuts against the first inner surface of the first body, so that the first convex portion may be completely accommodated in the second concave portion, so that the end cover and the insulating member are more compact, and may make more space for the electrode assembly, to further improve the capacity of the battery cell.

In some embodiments, there is a gap between the first end surface and a bottom wall of the second concave portion.

In the above solution, there is the gap between the first end surface of the first convex portion and the bottom wall of the second concave portion, to ensure that the second outer surface of the second body may effectively abut against the first inner surface of the first body, reducing a risk of over-positioning between the insulating member and the end cover.

In some embodiments, a position on the second body corresponding to the second concave portion is formed with a second convex portion, and the second convex portion extends to a second end surface from the second inner surface along the direction facing the electrode assembly.

In the above solution, the position on the second body corresponding to the second concave portion is formed with the second convex portion, the arrangement of the second convex portion may recess the second concave portion as much as possible along the direction facing the electrode assembly, to further increase a recess depth of the second concave portion.

In some embodiments, the electrode assembly includes a tab including a first connection portion; the battery cell further includes a current collecting member, the current collecting member includes a second connection portion for connecting to the first connection portion and a third connection portion for connecting to the electrode terminal; where, the second connection portion and the first connection portion are disposed in a stacking manner along a thickness direction of the end cover, and the third connection portion is located on a side of the second end surface facing the electrode assembly.

In the above solution, the second connection portion of the current collecting member and the first connection portion of the tab are disposed in a stacking manner along a thickness direction of the end cover, which facilitates connecting the second connection portion and the first connection portion together, for example, welding the second connection portion and the first connection portion together.

In some embodiments, the insulating member further includes a third concave portion, the third concave portion is recessed from the second end surface to the second inner surface along a direction away from the electrode assembly, and the third concave portion is configured to accommodate at least a part of the first connection portion and/or at least a part of the second connection portion.

In the above solution, the third concave portion of the insulating member may be configured to accommodate at least a part of the first connection portion and/or at least a part of the second connection portion, which may reduce a space inside the housing occupied by a connection part of the tab and the current collecting member, and make more space for the electrode assembly, to improve the capacity of the battery cell.

In some embodiments, the bottom wall of the second concave portion exceeds the second inner surface along a direction facing the electrode assembly.

In the above solution, the bottom wall of the second concave portion exceeds the second inner surface of the second body along a direction facing the electrode assembly, to recess the second concave portion in the second convex portion, which may further increase the recess depth of the second concave portion, and increase a space of the second concave portion for accommodating the first convex portion, so that the first convex portion may extend to a deeper position of the second convex portion.

In a second aspect, an embodiment of the present application provides a battery, including a box body, and the battery cell according to any one of the embodiments of the above first aspect; the battery cell being accommodated in the box body.

In the above solution, the battery cell is accommodated in the box body. When an internal space of the box body is constant, the length of the part of the electrode terminal protruding from the outside of the first body is reduced, and the internal space of the box body occupied by the battery cell is reduced, which is beneficial to accommodate more battery cells in the box body, so as to effectively improve the capacity of the battery.

In a third aspect, an embodiment of the present application provides a power consumption device, including the battery according to any one of the embodiments of the above second aspect.

In a fourth aspect, an embodiment of the present application provides a manufacturing method for a battery cell, including: providing a housing, the housing including an opening; providing an electrode assembly; providing an end cover assembly, the end cover assembly including an end cover and an electrode terminal, the electrode terminal being installed on the end cover; accommodating the electrode assembly in the housing; electrically connecting the electrode terminal and the electrode assembly; covering the end cover at the opening; where, the end cover includes a first body and a first convex portion, the first body includes a first inner surface and a first outer surface arranged oppositely, and the first convex portion extends to a first end surface from the first inner surface along a direction facing the electrode assembly, a position on the first body corresponding to the first convex portion is formed with a first concave portion recessed from the first outer surface along the direction facing the electrode assembly, the first concave portion is configured to accommodate the electrode terminal, and the electrode terminal is located on a side of the first end surface away from the electrode assembly.

In a fifth aspect, an embodiment of the present application provides a manufacturing device for a battery cell, including: a first providing apparatus, for providing a housing, the housing including an opening; a second providing apparatus, for providing an electrode assembly; a third providing apparatus, for providing an end cover assembly, the end cover assembly including an end cover and an electrode terminal, the electrode terminal being installed on the end cover; and an assembly apparatus, for accommodating the electrode assembly in the housing, the assembly apparatus being used for electrically connecting the electrode terminal and the electrode assembly, and the assembly apparatus being further used for covering the end cover at the opening; where, the end cover includes a first body and a first convex portion, the first body includes a first inner surface and a first outer surface arranged oppositely, and the first convex portion extends to a first end surface from the first inner surface along a direction facing the electrode assembly, a position on the first body corresponding to the first convex portion is formed with a first concave portion recessed from the first outer surface along the direction facing the electrode assembly, the first concave portion is configured to accommodate the electrode terminal, and the electrode terminal is located on a side of the first end surface away from the electrode assembly.

BRIEF DESCRIPTION OF DRAWINGS

In order to illustrate the technical solution in the embodiments of the present application more clearly, brief description will be made below to the drawings required in the embodiments of the present application, and apparently, the drawings described below are some embodiments of the present application only, and other drawings could be obtained based on these drawings by those ordinary skilled in this art without creative efforts.

Marking description: 10—box body; 11—accommodating space; 12—first portion; 13—second portion; 20—battery cell; 21—housing; 22—electrode assembly; 221—tab; 2211—first connection portion; 222—positive electrode plate; 223—negative electrode plate; 224—separator; 23—end cover assembly; 231—end cover; 2311—first body; 2311*a*—first inner surface; 2311*b*—first outer surface; 2312—first convex portion; 2312*a*—first end surface; 2313—first concave portion; 2313*a*—first bottom wall; 2313*b*—groove; 2314—electrode extraction hole; 232—electrode terminal; 2321—terminal main body; 2322—connection body; 233—insulating member; 2331—second body; 2331*a*—second inner surface; 2331*b*—second outer surface; 2332—second concave portion; 2332*a*—second bottom wall; 2333—second convex portion; 2333*a*—second end surface 2334—third concave portion; 234—pressure relief mechanism; 24—current collecting member; 241—second connection portion; 242—third connection portion; 243—fourth connection portion; 244—protrusion; 25—sealed space; 30—battery module; 31—bus component; 100—battery; 200—controller; 300—motor; 1000—vehicle; 1100—first providing apparatus; 1200—second providing apparatus; 1300—third providing apparatus; 1400—assembly apparatus; 2000—manufacturing device; Z—thickness direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" etc. in the specification and the claims of the present application as well as the above drawings are used for distinguishing different objects, rather than to describe a specific order or primary-secondary relationship.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, and cuboid or in another shape, which is not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cells includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive active substance layer. The positive active substance layer is coated on a surface of the positive electrode current collector, and the positive electrode current collector not coated with the positive active substance layer protrudes from the positive electrode current collector coated with the positive active substance layer and is used as a positive electrode tab. Taking a lithium-ion battery as an example, a material of the positive electrode current collector may be aluminum, and the positive active substance may be lithium cobalt oxides, lithium iron phosphate, ternary lithium or lithium manganate, etc. The negative electrode plate includes a negative electrode current collector and a negative active substance layer. The negative active substance layer is coated on a surface of the negative electrode current collector, and the negative electrode current collector not coated with the negative active substance layer protrudes from the negative electrode current collector coated with the negative active substance layer and is used as a negative electrode tab. The material of the negative electrode current collector may be copper, and the negative active substance may be carbon or silicon, etc. In order to ensure that no fusing occurs when a large current passes through, there are a plurality of positive electrode tabs which are stacked together, and there are a plurality of negative electrode tabs which are stacked together. A material of the separator may be polypropylene (PP) or polyethylene (PE), etc. In addition, the electrode assembly may be a winding structure or a stacked structure, and the embodiments of the present application are not limited thereto.

The battery cell may also include a housing and an end cover assembly, the end cover assembly covers at the housing, to provide a sealed space for the electrode assembly and the electrolytic solution, and the electrode assembly is electrically connected to the electrode terminal of the end cover assembly.

For a general battery, the battery includes a battery cell, and a capacity of the battery may be affected by a structure of the battery cell.

The inventor found that in the battery cell, after the end cover of the end cover assembly covers at the housing, a size of a part of the electrode terminal of the end cover assembly protruding from the outside of the first body is long, so that the entire battery cell occupies a large space, which in turn reduces the capacity of the battery.

In view of this, an embodiment of the present application provides a technical solution. By providing a first convex portion on a first body of the end cover, the first convex portion extends to a first end surface from the first inner surface of the first body along a direction facing the electrode assembly, a position on the first body corresponding to the first convex portion is formed with a first concave portion, the first concave portion is a first concave portion recessed from the first outer surface of the first body along the direction facing the electrode assembly, the first concave portion is used for accommodating the electrode terminal, and the electrode terminal is located on a side of the first end surface away from the electrode assembly, to reduce a length of the part of the electrode terminal protruding from the outside of the first body, to achieve the purpose of improve the capacity of the battery.

The technical solution described in the embodiment of the present application is applicable to a battery and a power consumption device using the battery.

The power consumption device may be vehicles, mobile phones, portable devices, notebook computers, ships, spacecraft, electric toys, electric tools, etc. The vehicle may be fuel vehicles, gas vehicles or new energy vehicles; new energy vehicles may be pure electric vehicles, hybrid vehicles or extended range vehicles, etc.; the spacecrafts include airplanes, rockets, space shuttles and spaceships, etc.; the electric toys include fixed or mobile electric toys, such as game consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, etc. The embodiment of the present application does not impose special restrictions on the above power consumption device.

For the convenience of description, the following embodiments take a vehicle as an example of the power consumption device for description.

Figure 1:
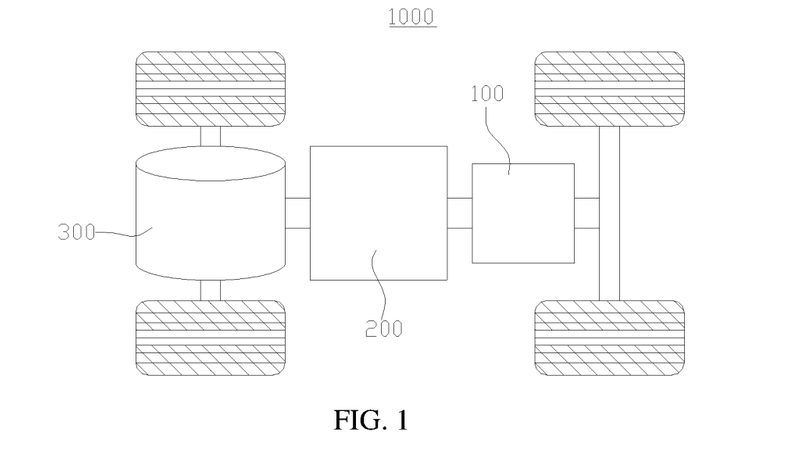
FIG. 1 is a schematic structural diagram of a vehicle provided by some embodiments of the present application.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 may further include a controller 200 and a motor 300. The controller 200 is used for controlling the battery 100 to supply power to the motor 300, for example, for working power requirements during starting, navigating, and driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
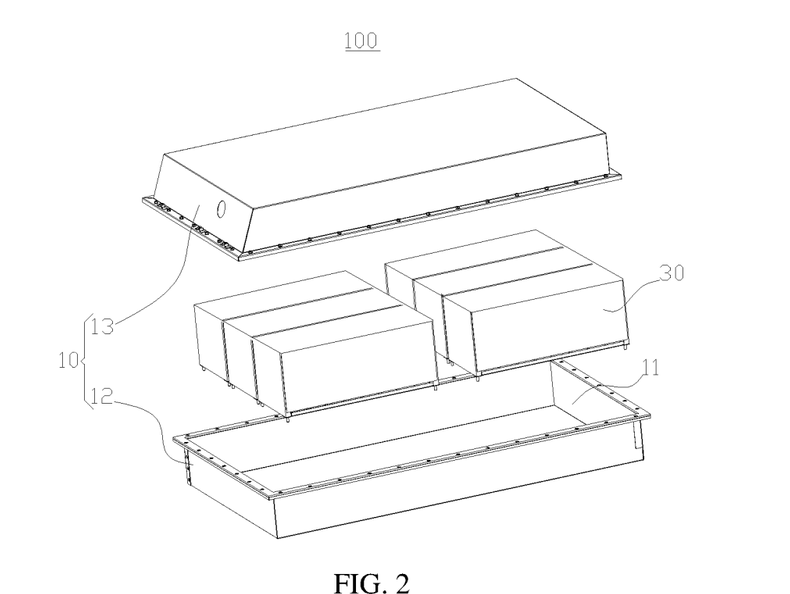
FIG. 2 is an exploded view of a battery provided by some embodiments of the present application.

Please refer to FIG. 2. FIG. 2 is an exploded view of a battery 100 provided by some embodiments of the present application. The battery 100 includes a box body 10 and a battery cell 20, and the battery cell 20 is accommodated in the box body 10.

Among that, the box body 10 is used for providing an accommodating space 11 for the battery cell 20, and the box body 10 may have various structures.

In some embodiments, the box body 10 may include a first portion 12 and a second portion 13, the first portion 12 and the second portion 13 are mutually covered, and the first portion 12 and the second portion 13 together define an accommodating space 11 for accommodating the battery cell 20. The second portion 13 may be a hollow structure with one end open, the first portion 12 is a plate-shaped structure, and the first portion 12 covers at the opening side of the second portion 13, so that the first portion 12 and the second portion 13 together define the accommodating space 11. The first portion 12 and the second portion 13 may also both be hollow structures with one end open, and the opening side of the first portion 12 covers at the opening side of the second portion 13. Of course, the box body 10 formed by the first portion 12 and the second portion 13 may have various shapes, such as a cylinder, a cuboid, etc.

In the battery 100, there may be a plurality of battery cells 20, and the plurality of battery cells 20 may be connected in series or in parallel or in hybrid. The hybrid connection means that the plurality of battery cells 20 are both connected in series and in parallel. The plurality of battery cells 20 may be directly connected together in series or in parallel or in hybrid, and then a whole formed by the plurality of battery cells 20 may be accommodated in the box body 10; of course, the plurality of battery cells 20 may also be first connected in series, or in parallel or in hybrid to form a battery module 30; then a plurality of battery modules 30 are connected in series or in parallel or in hybrid to form as a whole, and are accommodated inside the box body 10.

Figure 3:
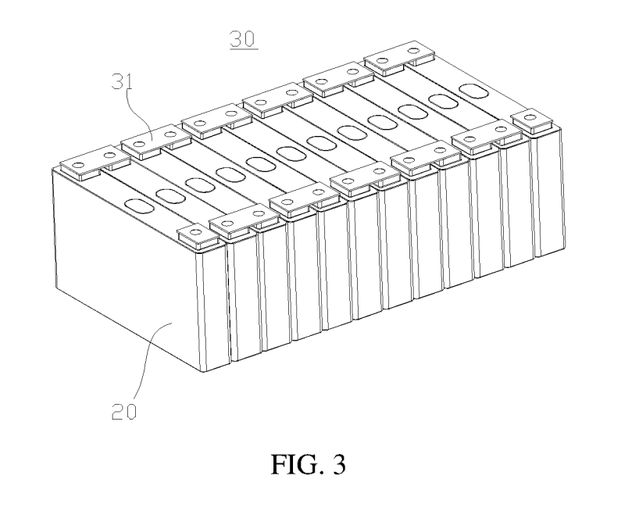
FIG. 3 is a schematic structural diagram of the battery module shown in FIG. 2.

In some embodiments, please refer to FIG. 3. FIG. 3 is a schematic structural diagram of the battery module 30 shown in FIG. 2. A battery 100 includes a plurality of battery module 30. The battery module 30 includes a plurality of battery cells 20. The plurality of battery cells 20 are first connected in series, or in parallel or in hybrid to form the battery module 30. The plurality of battery modules 30 are then connected in series or in parallel or in hybrid to form as a whole, and are accommodated in the box body 10.

The plurality of battery cells 20 in the battery module 30 may be electrically connected through a bus component 31, to achieve the connection of the plurality of battery cells 20 in the battery module 30 in series, or in parallel or in hybrid.

Figure 4:
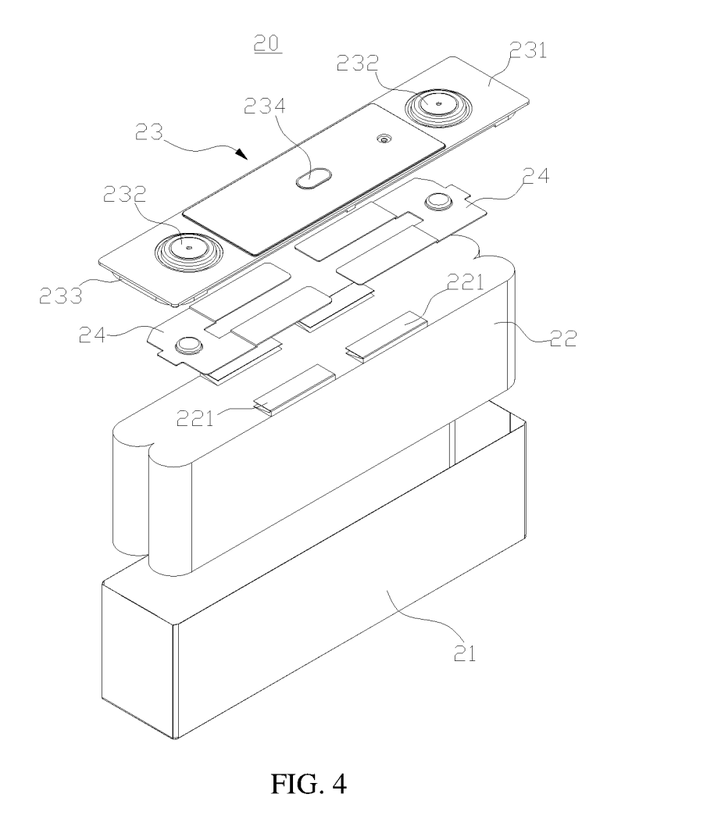
FIG. 4 is an exploded view of a battery cell provided by some embodiments of the present application.

Please refer to FIG. 4. FIG. 4 is an exploded view of a battery cell 20 provided by some embodiments of the present application. The battery cell 20 includes a housing 21, an electrode assembly 22 and an end cover assembly 23. The housing 21 includes an opening. The electrode assembly 22 is accommodated in the housing 21. The end cover assembly 23 includes an end cover 231 and an electrode terminal 232, the end cover 231 is used for covering at an opening, the electrode terminal 232 is installed on the end cover 231, the electrode terminal 232 is used for electrical connection with the electrode assembly 22, and the electrode terminal 232 is used for outputting electric energy of the battery cell 20.

Among that, the housing 21 may have various shapes, such as a cylinder, a cuboid, etc. The shape of the housing 21 may be determined according to a specific shape of the electrode assembly 22. For example, if the electrode assembly 22 has a cylindrical structure, the housing 21 may select a cylindrical structure; and if the electrode assembly 22 has a cuboid structure, the housing 21 may select a cuboid structure. In FIG. 4, illustratively, the housing 21 and the electrode assembly 22 both have a cuboid structure.

The housing 21 and the end cover 231 may be made of various materials, such as copper, iron, aluminum, stainless steel, aluminum alloy, plastic, etc., which are not particularly limited in the embodiment of the present application.

There may be one or more electrode assemblies 22 accommodated in the housing 21. Illustratively, in FIG. 4, there are two electrode assemblies 22 accommodated in the housing 21.

In some embodiments, the end cover assembly 23 may also include an insulating member 233, the insulating member 233 is located on a side of the end cover 231 facing the electrode assembly 22, and the insulating member 233 is used for separating the electrode assembly 22 and the end cover 231, to reduce a risk of short circuit.

Illustratively, the insulating member 233 may be plastic, rubber, etc.

In some embodiments, the battery cell 20 may also include a current collecting member 24, the current collecting member 24 is used for connecting a tab 221 of the electrode assembly 22 and the electrode terminal 232, to achieve electrical connection between the electrode terminal 232 and the electrode assembly 22.

The current collecting member 24 is located on the side of the insulating member 233 facing the electrode assembly 22, and the insulating member 233 may also play a role to separate the current collecting member 24 and the end cover 231.

Illustratively, the current collecting member 24 is a metal conductor, such as copper, iron, aluminum, steel, aluminum alloy, etc.

Figure 5:
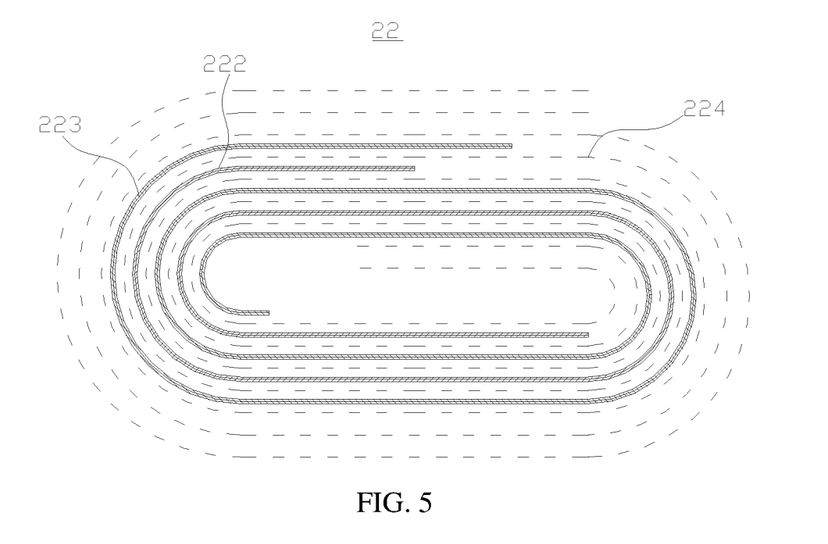
FIG. 5 is a schematic structural diagram of an electrode assembly provided by some embodiments of the present application.

In some embodiments, please refer to FIG. 5. FIG. 5 is a schematic structural diagram of an electrode assembly 22 provided by some embodiments of the present application. The electrode assembly 22 may include a positive electrode plate 222, a negative electrode plate 223 and a separator 224. The electrode assembly 22 may be a winding structure formed by winding the positive electrode plate 222, the separator 224 and a negative electrode plate 223, and the electrode assembly 22 may also be a stacked structure formed by disposing the positive electrode plate 222, the separator 224 and the negative electrode plate 223 in a stacking manner. FIG. 5 illustratively shows a condition that the electrode assembly 22 is a winding structure.

The positive electrode plate 222 may include a positive electrode current collector and a positive electrode active substance layer. The positive electrode active substance layer is coated on a surface of the positive electrode current collector. The negative electrode plate 223 may include a negative electrode current collector and a negative electrode active substance layer. The negative electrode active substance layer is coated on a surface of the negative electrode current collector. The separator 224 is between the positive electrode plate 222 and the negative electrode plate 223, and is used for separating the positive electrode plate 222 and the negative electrode plate 223, to reduce the risk of short circuit between the positive electrode plate 222 and the negative electrode plate 223.

Among that, a material of the separator 224 may be polypropylene (PP) or polyethylene (PE), etc.

The tab 221 in the electrode assembly 22 is divided into a positive electrode tab and a negative electrode tab. The positive electrode tab may be a part of the positive electrode current collector that is not coated with a positive electrode active substance layer; and the negative electrode tab may be a part of the negative electrode current collector that is not coated with a negative electrode active substance layer.

Figure 6:
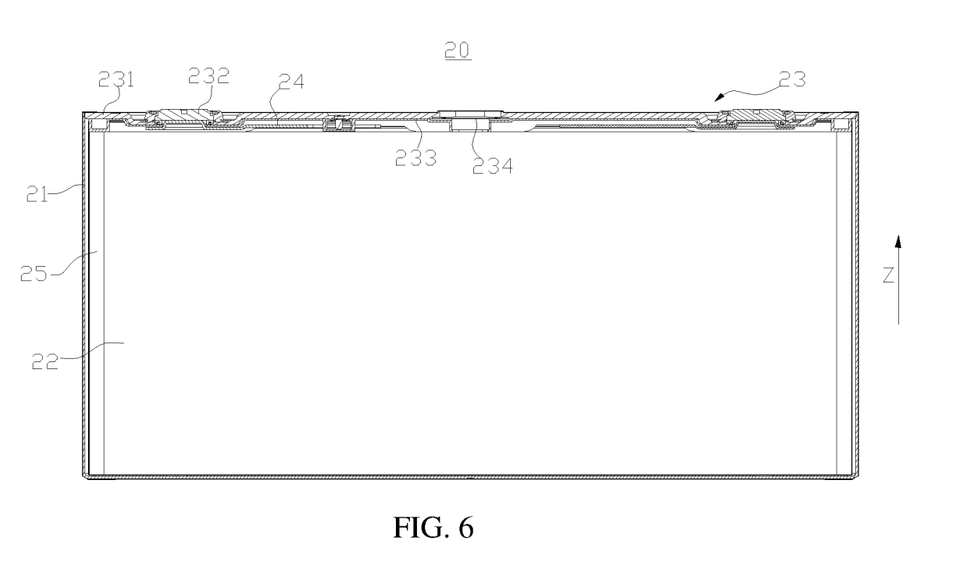
FIG. 6 is a cross-sectional view of the battery cell shown in FIG. 4.

In the embodiment of the present application, please refer to FIG. 6. FIG. 6 is a cross-sectional view of the battery cell 20 shown in FIG. 4. The end cover 231 of the end cover assembly 23 covers at the opening of the housing 21, to form a sealed space 25 for accommodating the battery cell 20. The sealed space 25 is further used for accommodating an electrolyte, such as an electrolytic solution. The electrode terminal 232 of the end cover assembly 23 is an output component for outputting electric energy of the battery cell 20.

There may be one or two openings of the housing 21. If there is one opening of the housing 21, there may be one end cover assembly 23; and if there are two openings of the housing 21, there may be two end cover assemblies 23, and the end covers 231 in the two end cover assemblies 23 cover at the two openings, respectively.

There may be one or two electrode terminals 232 in the end cover assembly 23.

In some embodiments, please continue to refer to FIG. 6. There is one opening of the housing 21, and there is also one end cover assembly 23. The end cover assembly 23 may be provided with two electrode terminals 232. One electrode terminal 232 in the end cover assembly 23 may electrically connect to one tab 221 (positive electrode tab) of the electrode assembly 22 through one current collecting member 24; and another electrode terminal 232 in the end cover assembly 23 may electrically connect to another tab 221 (negative electrode tab) of the electrode assembly 22 through another current collecting member 24.

In some other embodiments, there are two openings of the housing 21, the two openings are provided on opposite sides of the housing 21. There are two end cover assemblies 23, and the two end cover assemblies 23 cover at the two openings of the housing 21, respectively. In this case, there may be one end cover 231 in the end cover assembly 23. The electrode terminal 232 in one end cover assembly 23 may electrically connect to one tab 221 (positive electrode tab) of the electrode assembly 22 through one current collecting member 24. The electrode terminal 232 of another end cover assembly 23 may be electrically connected to another tab 221 (negative electrode tab) of the electrode assembly 22 through another current collecting member 24.

In some embodiments, the end cover assembly 23 may also include a pressure relief mechanism 234. The pressure relief mechanism 234 is installed on the end cover 231. The pressure relief mechanism 234 is used for relieving an internal pressure of the battery cell 20 when the internal pressure or temperature of the battery cell 20 reaches a predetermined value.

Of course, if there is one end cover assembly 23 in the battery cell 20, the pressure relief mechanism 234 may be installed on the end cover 231 of the end cover assembly 23; if there are two end cover assemblies 23 in the battery cell 20, the pressure relief mechanism 234 may be installed on the end cover 231 of each of the end cover assemblies 23, or the pressure relief mechanism 234 may be installed on the end cover 231 of only one end cover assembly 23.

Illustratively, the pressure relief mechanism 234 may be as an explosion-proof valve, a rupture disk, a gas valve, a pressure relief valve, or a safety valve, etc.

Figure 7:
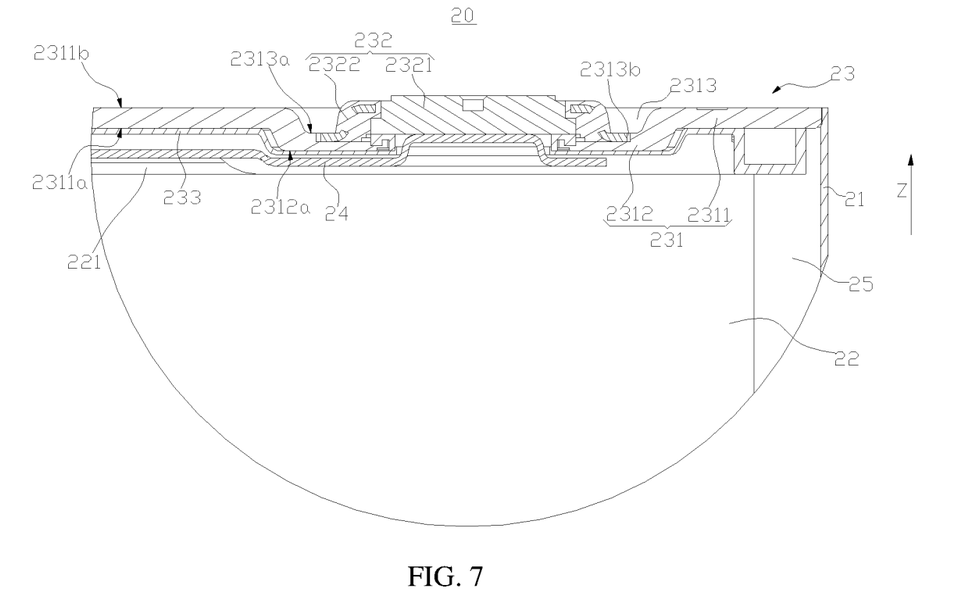
FIG. 7 is a partially enlarged view of the battery cell shown in FIG. 6.

In the embodiment of the present application, in order to improve the capacity of the battery 100, please refer to FIG. 7. FIG. 7 is a partially enlarged view of the battery cell 20 shown in FIG. 6. The end cover 231 includes a first body 2311 and a first convex portion 2312, the first body 2311 includes a first inner surface 2311a and a first outer surface 2311b arranged oppositely, and the first convex portion 2312 extends to a first end surface 2312a from the first inner surface 2311a along a direction facing the electrode assembly 22, a position on the first body 2311 corresponding to the first convex portion 2312 is formed with a first concave portion 2313 recessed from the first outer surface 2311b along the direction facing the electrode assembly 22, and the first concave portion 2313 is configured to accommodate the electrode terminal 232.

The position on the first body 2311 of the end cover 231 corresponding to the first convex portion 2312 is formed with the first concave portion 2313 recessed from the first outer surface 2311b along the direction facing the electrode assembly 22, the first concave portion 2313 may be used for accommodating the electrode terminal 232, to reduce a length of a part of the electrode terminal 232 protruding from the outside of the first body 2311. Since a position of the first convex portion 2312 and a position of the first concave portion 2313 are opposite, the first convex portion 2312 may recess the first concave portion 2313 as much as possible along the direction facing the electrode assembly 22, further reducing the length of the part of the electrode terminal 232 protruding from the outside of the first body 2311. When an internal space of the box body 10 is constant, the length of the part of the electrode terminal 232 protruding from the outside of the first body 2311 is reduced, and the internal space of the box body 10 occupied by the battery cell 20 is reduced, which is beneficial to accommodate more battery cells 20 in the box body 10, so as to effectively improve the capacity of the battery 100. When the length of the battery cell 20 (the size of the battery cell 20 in the extending direction of the electrode terminal 232) is constant, the length of the part of the electrode terminal 232 protruding from the outside of the first body 2311 may be reduced, which may appropriately increase a length of the housing 21, so as to increase a space of the housing 21 to accommodate the electrode assembly 22, which may effectively increase the capacity of the battery cell 20, and may further increase the capacity of the entire battery 100.

It should be noted that the first concave portion 2313 may accommodate all of the electrode terminal 232 or a part of the electrode terminal 232.

Among that, the first body 2311 is used for covering at the opening of the housing 21. The electrode terminal 232 may be installed at the bottom of the first concave portion 2313. The greater a recess depth of the first concave portion 2313 along the direction facing the electrode assembly 22, the longer the length of the electrode terminal 232 extending into the first concave portion 2313, and the shorter the length of the part of the electrode terminal 232 protruding from the outside of the first body 2311.

Illustratively, shapes of the first concave portion 2313 and the second concave portion 2332 may be a cylinder, a cuboid, etc.

In some embodiments, the electrode terminal 232 is located on the side of the first end surface 2312a away from the electrode assembly 22, that is, the electrode terminal 232 does not exceed the first end surface 2312a along the direction facing the electrode assembly 22, the electrode terminal 232 does not occupy a space inside the housing 21 and may make more space for the electrode assembly 22 in the housing 21, which is beneficial to improve the capacity of the battery cell 20. In some other embodiments, the electrode terminal 232 may also exceed the first end surface 2312a along the direction facing the electrode assembly 22.

In some embodiments, as shown in FIG. 7, a bottom wall of the first concave portion 2313 may exceed the first inner surface 2311a along the direction facing the electrode assembly 22, that is, the bottom wall of the first concave portion 2313 is closer to the electrode assembly 22 than the first inner surface 2311a, to recess the first concave portion 2313 in the first convex portion 2312, which further increases a recess depth of the first concave portion 2313, and further reduces the length of the part of the electrode terminal 232 protruding from the outside of the first body 2311. In some other embodiments, the bottom wall of the first concave portion 2313 may also be flush with the first inner surface 2311a, which may also increases the recess depth of the first concave portion 2313, to reduce the length of the part of the electrode terminal 232 protruding from the outside of the first body 2311. In some other embodiments, the bottom wall of the first concave portion 2313 may also exceed the first inner surface 2311a along the direction away from the electrode assembly 22, that is, the first inner surface 2311a is closer to the electrode assembly 22 than the bottom wall of the first concave portion 2313. Among that, the bottom wall of the first concave portion 2313 is the first bottom wall 2313a.

In some embodiments, please continue to refer to FIG. 7. The bottom wall of the first concave portion 2313 is provided with a groove 2313b recessed along a direction facing the electrode assembly 22, and the electrode terminal 232 is partially accommodated in the groove 2313b.

The groove 2313b may play a role to position the electrode terminal 232, and may facilitate positioning and installation of the electrode terminal 232. The groove 2313b may have a shape that may be matched with the electrode terminal 232. For example, the electrode terminal 232 is cylindrical, and the groove 2313b is also cylindrical.

Optionally, the depth of the first concave portion 2313 is greater than a depth of the groove 2313b, that is, a distance from the first outer surface 2311b to the first bottom wall 2313a is greater than a distance from the first bottom wall 2313a to a bottom wall of the groove 2313b.

Optionally, the electrode terminal 232 may have a split structure. The electrode terminal 232 includes a connection body 2322 and a terminal main body 2321. The terminal main body 2321 is used for electrical connection with the electrode assembly 22, and the terminal main body 2321 is installed on the end cover 231 through the connection body 2322; where, the connection body 2322 is at least partially accommodated in the groove 2313b and fixed to the side wall or the bottom wall of the groove 2313b.

The terminal main body 2321 is used for electrical connection with the electrode assembly 22, and a role of the terminal main body 2321 is to output electric energy of the battery cell 20. The connection body 2322 plays a role to connect the terminal main body 2321 and the end cover 231, and the connection body 2322 is at least partially accommodated in the groove 2313b and fixed to the side wall or the bottom wall of the groove 2313b, so as to fix the terminal main body 2321.

The connection body 2322 may be circumferentially coated around the outer circumference of the terminal main body 2321, to achieve fixation of the connection body 2322 and the terminal main body 2321. Illustratively, the connection body 2322 is a ring structure coated around the outer circumference of the terminal main body 2321.

After the connection body 2322 is partially accommodated in the groove 2313b, the connection body 2322 may be fixed to the side wall or the bottom wall of the groove 2313b by means of welding. Taking the connection body 2322 fixed to the side wall of the groove 2313b as an example, the connection body 2322 may abut against the bottom wall of the groove 2313b; and during the welding process, the connection body 2322 is fixed to the side wall of the groove 2313b.

In order to facilitate the welding of the connection body 2322 and the end cover 231, a distance may be made to exist between the side wall of the groove 2313b and the side wall of the first concave portion 2313 in a thickness direction Z perpendicular to the end cover 231. Illustratively, the distance is no less than 1 mm.

It should be noted that, in other embodiments, the electrode terminal 232 may also be an integral structure. For example, the electrode terminal 232 is an integral cylindrical structure.

Figure 8:
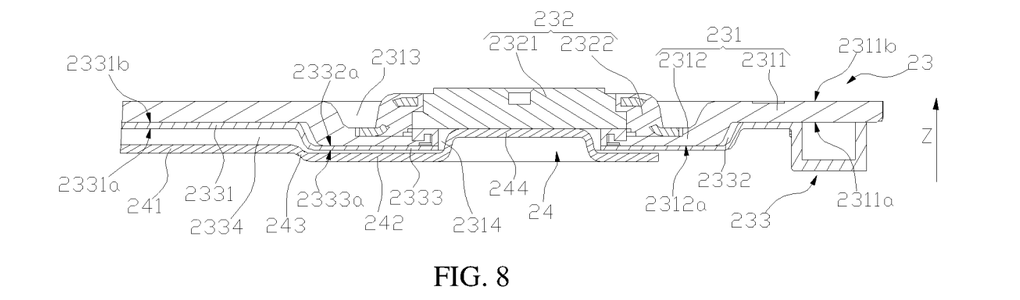
FIG. 8 is a partially enlarged view of the end cover assembly shown in FIG. 7.

In some embodiments, please refer to FIG. 8. FIG. 8 is a partially enlarged view of the end cover assembly 23 shown in FIG. 7. The end cover 231 is provided with an electrode extraction hole 2314 communicating with the first concave portion 2313 and penetrating the first end surface 2312a, and the electrode terminal 232 covers the electrode extraction hole 2314. This structure makes the electrode terminal 232 not to extend into the electrode extraction hole 2314, which facilitates installing the electrode terminal 232 in the first concave portion 2313.

Illustratively, the electrode extraction hole 2314 communicates with the first concave portion 2313 through a groove 2313b on the first bottom wall 2313a. The terminal main body 2321 in the electrode terminal 232 covers the electrode extraction hole 2314, so that the entire electrode terminal 232 covers the electrode extraction hole 2314.

In some embodiments, in the case that the end cover assembly 23 is provided with the insulating member 233, the insulating member 233 includes a second body 2331 and a second concave portion 2332, the second body 2331 is located on a side of the first body 2311 facing the electrode assembly 22 (refer to FIG. 7), the second body 2331 includes a second inner surface 2331a and a second outer surface 2331b arranged oppositely, the second concave portion 2332 is recessed from the second outer surface 2331b along a direction facing the electrode assembly 22, and the second concave portion 2332 is configured to accommodate the first convex portion 2312.

The second concave portion 2332 of the insulating member 233 may accommodate the first convex portion 2312 of the end cover 231, which may reduce a distance between the first body 2311 and the second body 2331, so as to make more space for the electrode assembly 22, which is beneficial to improve the capacity of the battery cell 20.

Optionally, the first outer surface 2311b of the second body 2331 abuts against the first inner surface 2311a of the first body 2311. This structure makes the first convex portion 2312 to be completely accommodated in the second concave portion 2332, so that the end cover 231 and the insulating member 233 are more compact, and may make more space for the electrode assembly 22, to further improve the capacity of the battery cell 20.

Further, there is the gap between the first end surface 2312a and the bottom wall of the second concave portion 2332, to ensure that the second outer surface 2331b of the second body 2331 may effectively abut against the first inner surface 2311a of the first body 2311, reducing a risk of over-positioning between the insulating member 233 and the end cover 231. Among that, the bottom wall of the second concave portion 2332 is the second bottom wall 2332a. Of course, in other embodiments, the first end surface 2312a may also directly abut against the bottom wall (the second bottom wall 2332a) of the second concave portion 2332.

In some embodiments, a position on the second body 2331 corresponding to the second concave portion 2332 is formed with a second convex portion 2333, and the second convex portion 2333 extends to a second end surface 2333a from the second inner surface 2331a along the direction facing the electrode assembly 22. The arrangement of the second convex portion 2333 may recess the second concave portion 2332 as much as possible along the direction facing the electrode assembly 22, to further increase a recess depth of the second concave portion 2332.

Of course, the second bottom wall 2332a may be flush with the second inner surface 2331a; the second bottom wall 2332a may also exceed the second inner surface 2331a of the second body 2331 along the direction facing the electrode assembly 22, that is, the second bottom wall 2332a is closer to the electrode assembly 22 than the second inner surface 2331a; and the second bottom wall 2332a may also exceed the second inner surface 2331a of the second body 2331 along the direction away from the electrode assembly 22, that is, the second inner surface 2331a is closer to the electrode assembly 22 than the second bottom wall 2332a. In FIG. 8, it illustratively shows that the second bottom wall 2332a exceeds the second inner surface 2331a along a direction facing the electrode assembly 22, to recess the second concave portion 2332 in the second convex portion 2333, which may further increase the recess depth of the second concave portion 2332, and increase a space of the second concave portion 2332 for accommodating the first convex portion 2312, so that the first convex portion 2312 may extend to a deeper position of the second convex portion 2333.

It should be noted that if the electrode terminal 232 exceeds the first end surface 2312a along the direction facing the electrode assembly 22, for example, the terminal main body 2321 in the electrode terminal 232 exceeds the first end surface 2312a along the direction facing the electrode assembly 22, in this case, the electrode terminal 232 may be located on a side of the second end surface 2333a facing away from the electrode assembly 22, that is, if the electrode terminal 232 does not exceed the second end surface 2333a along the direction facing the electrode assembly 22.

In some embodiments, if the tab 221 of the electrode assembly 22 electrically connects to the electrode terminal 232 through the current collecting member 24, the tab 221 may include a first connection portion 2211. The current collecting member 24 may include a second connection portion 241 for connecting to the first connection portion 2211 and a third connection portion 242 for connecting to the electrode terminal 232; where, the second connection portion 241 and the first connection portion 2211 are disposed in a stacking manner along a thickness direction Z of the end cover 231, and the third connection portion 242 is located on a side of the second end surface 2333a facing the electrode assembly 22.

The second connection portion 241 of the current collecting member 24 and the first connection portion 2211 of the tab 221 are disposed in a stacking manner along a thickness direction Z of the end cover 231, which facilitates connecting the second connection portion 241 and the first connection portion 2211 together, for example, welding the second connection portion 241 and the first connection portion 2211 together.

The third connection portion 242 may abut against the second end surface 2333a, or may have a gap with the second end surface 2333a. If the third connection portion 242 abuts against the second end surface 2333a, on one hand, stability of the current collecting member 24 may be improved, and on the other hand, the current collecting member 24 and the insulating member 233 may be made more compact.

In some embodiments, the insulating member 233 may also include a third concave portion 2334, the third concave portion 2334 is recessed from the second end surface 2333a to the second inner surface 2331a along a direction away from the electrode assembly 22, and the third concave portion 2334 is configured to accommodate at least a part of the first connection portion 2211 and/or at least a part of the second connection portion 241. The arrangement of the third concave portion 2334 may reduce an internal space of the housing 21 occupied by a connection part of the tab 221 and the current collecting member 24, and make more space for the electrode assembly 22, to improve the capacity of the battery cell 20.

Taking the electrode terminals 232 in the end cover assembly 23 as two as an example, positions on the second inner surface 2331a of the second body 2331 of the insulating member 233 corresponding to the two electrode terminals 232 respectively may be provided with two second convex portions 2333, and the third concave portion 2334 may be formed on a side of the end cover 231 facing the electrode assembly 22 and located at an area between the two second convex portions 2333.

Figure 9:
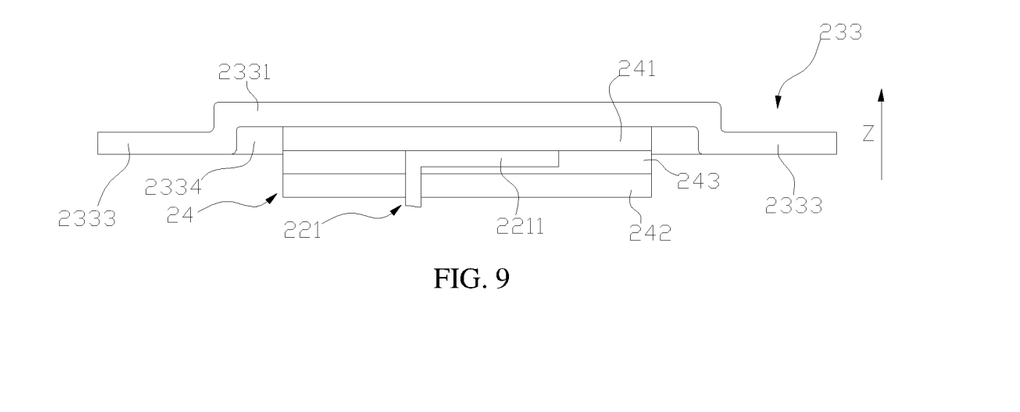
FIG. 9 is a positional relationship diagram of an insulating member, a current collecting member and a tab provided by some embodiments of the application.
Figure 10:
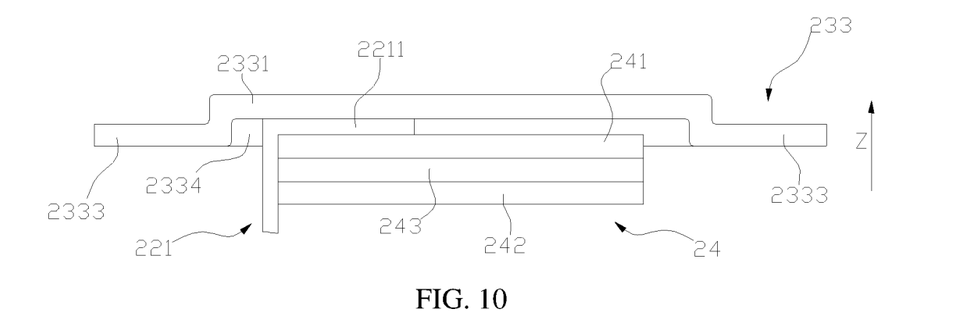
FIG. 10 is a positional relationship diagram of an insulating member, a current collecting member and a tab provided by some other embodiments of the present application.

In some embodiments, please refer to FIG. 9. FIG. 9 is a positional relationship diagram of an insulating member 233, a current collecting member 24 and a tab 221 provided by some embodiments of the application. In the thickness direction Z of the end cover 231, the first connection portion 2211 is closer to the electrode assembly 22 than the second connection portion 241 (refer to FIG. 7), and the second connection portion 241 is accommodated in the third concave portion 2334. In some other embodiments, please refer to FIG. 10. FIG. 10 is a diagram of the positional relationship among the insulating member 233, the current collecting member 24, and the tab 221 provided by some other embodiments of the application.

Figure 11:
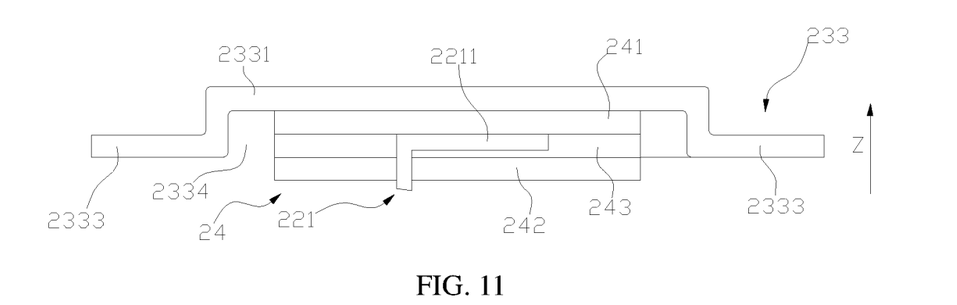
FIG. 11 is a positional relationship diagram of an insulating member, a current collecting member and a tab provided by some other embodiments of the application.

In the thickness direction Z of the end cover 231, the second connection portion 241 is closer to the electrode assembly 22 than the first connection portion 2211, and the first connection portion 2211 is accommodated in the third concave portion 2334. In some other embodiments, please refer to FIG. 11. FIG. 11 is a positional relationship diagram of an insulating member 233, a current collecting member 24 and a tab 221 provided by some other embodiments of the application. The first connection portion 2211 and the second connection portion 241 are both accommodated in the third concave portion 2334, to further make more space for the electrode assembly 22.

Figure 12:
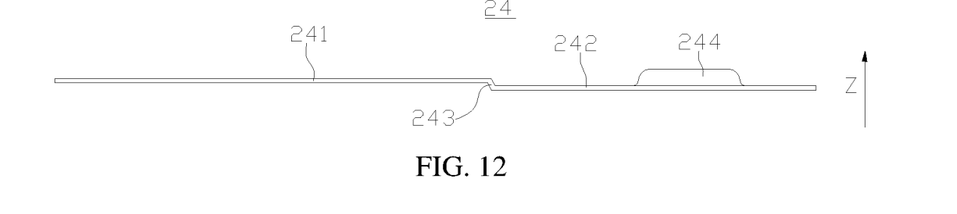
FIG. 12 is a schematic structural diagram of the current collecting member shown in FIG. 8.

In some embodiments, please refer to FIG. 12. FIG. 12 is a schematic structural diagram of the current collecting member 24 shown in FIG. 8. The current collecting member 24 may further include a fourth connection portion 243. A third connection portion 242 connects to a second connection portion 241 through the fourth connection portion 243, and the third connection portion 242 and the second connection portion 241 are spaced apart in the thickness direction Z of the end cover 231. For the current collecting member 24 of this structure, the second connection portion 241 may be accommodated in the third concave portion 2334, and the third connection portion 242 may abut against the second end surface 2333a of the second convex portion 2333.

Illustratively, the second connection portion 241, the fourth connection portion 243 and the third connection portion 242 are sequentially connected to form a "Z"-shaped plate structure. Among that, in the thickness direction Z of the end cover 231, a side of the third connection portion 242 close to the second connection portion 241 is provided with a protrusion 244 for connecting and fixing with the electrode terminal 232. Of course, the protrusion 244 on the third connection portion 242 may penetrate the electrode extraction hole 2314 on the end cover 231 to be connected and fixed to the terminal main body 2321 of the electrode terminal 232. For example, the protrusion 244 is welded to the terminal main body 2321.

In some embodiments, the end cover assembly may not be provided with an insulating member. In this case, the end cover is made of a plastic material, and the current collecting member and the end cover may be in direct contact.

Figure 13:
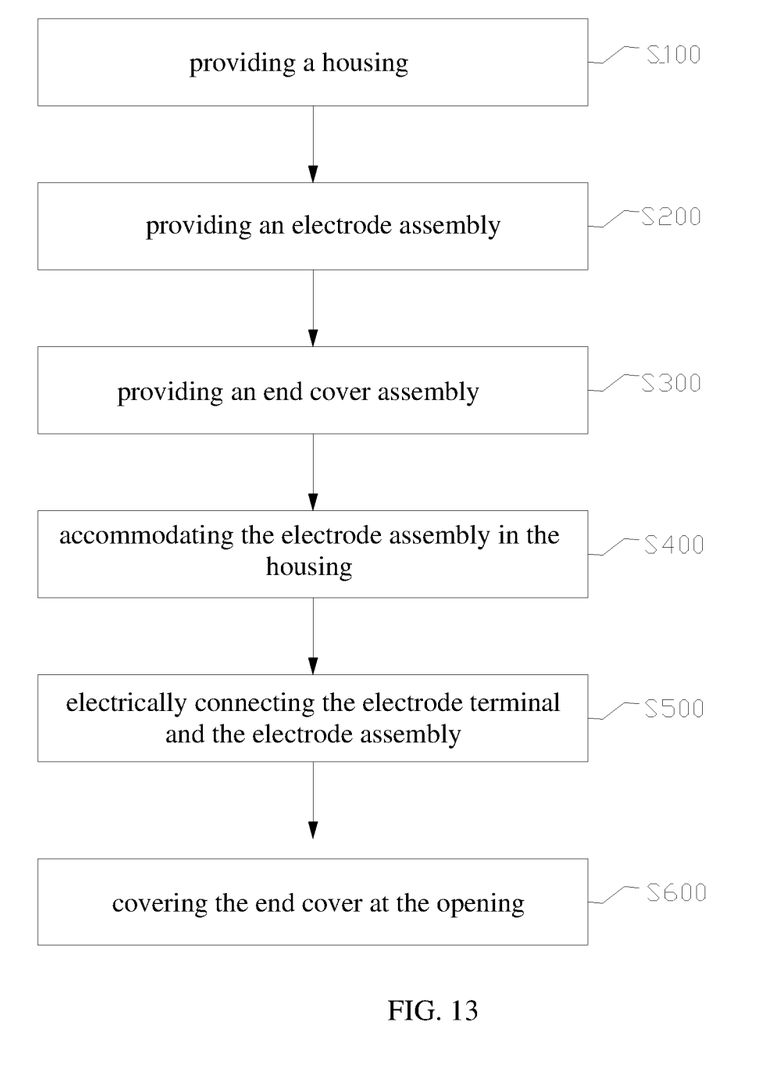
FIG. 13 is a flowchart of a manufacturing method for a battery cell provided by some embodiments of the present application.

Please refer to FIG. 13. FIG. 13 is a flowchart of a manufacturing method for a battery cell 20 provided by some embodiments of the present application. The method includes:

S100: providing a housing 21, the housing 21 including an opening;
S200: providing an electrode assembly 22;
S300: providing an end cover assembly 23, the end cover assembly 23 including an end cover 231 and an electrode terminal 232, the electrode terminal 232 being installed on the end cover 231;
S400: accommodating the electrode assembly 22 in the housing 21;
S500: electrically connecting the electrode terminal 232 and the electrode assembly 22; and
S600: covering the end cover 231 at the opening;
where, the end cover 231 includes a first body 2311 and a first convex portion 2312, the first body 2311 includes a first inner surface 2311a and a first outer surface 2311b arranged oppositely, and the first convex portion 2312 extends to a first end surface 2312a from the first inner surface 2311a along a direction facing the electrode assembly 22, a position on the first body 2311 corresponding to the first convex portion 2312 is formed with a first concave portion 2313 recessed from the first outer surface 2311b along the direction facing the electrode assembly 22, the first concave portion 2313 is configured to accommodate the electrode terminal 232, and the electrode terminal 232 is located on a side of the first end surface 2312a away from the electrode assembly 22.

In the above method, a sequential order of step S100, step S200, and step S300 is not limited. For example, step S300 may be performed first, then step S200 is performed, and then step S100 is performed. In addition, step S500 may be performed before step S400, and step S500 may also be performed after step S400.

The related structure of the battery cell 20 manufactured by the above method may refer to the battery cell 20 provided in the above respective embodiment.

Figure 14:
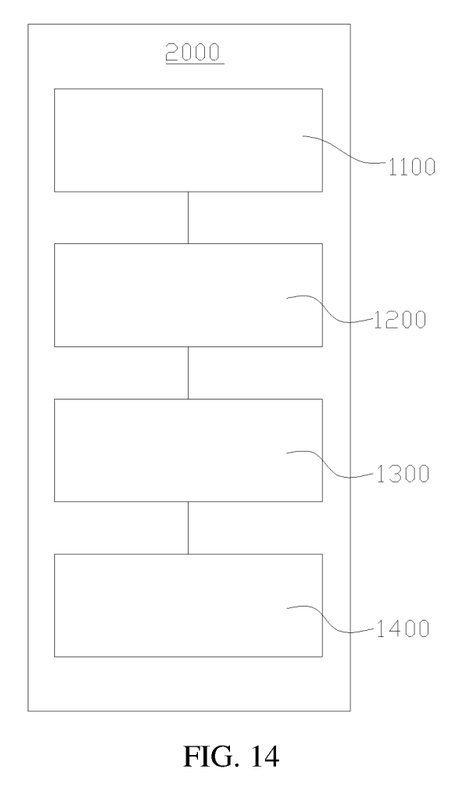
FIG. 14 is a schematic block diagram of a manufacturing device for a battery cell provided by some embodiments of the present application.

Please refer to FIG. 14. FIG. 14 is a schematic block diagram of a manufacturing device 2000 for a battery cell 20 provided by some embodiments of the present application. The manufacturing device 2000 includes a first providing apparatus 1100, a second providing apparatus 1200, a third providing apparatus 1300 and an assembly apparatus 1400.

The first providing apparatus 1100 is used for providing a housing 21, and the housing 21 includes an opening. The second providing apparatus 1200 is used for providing an electrode assembly 22. The third providing apparatus 1300 is used for providing an end cover assembly 23, the end cover assembly 23 includes an end cover 231 and an electrode terminal 232, and the electrode terminal 232 is installed on the end cover 231. The assembly apparatus 1400 is used for accommodating the electrode assembly 22 in the housing 21, the assembly apparatus 1400 is used for electrically connecting the electrode terminal 232 and the electrode assembly 22, and the assembly apparatus 1400 is further used for covering at the end cover 231 at the opening.

Among that, the end cover 231 includes a first body 2311 and a first convex portion 2312, the first body 2311 includes a first inner surface 2311a and a first outer surface 2311b arranged oppositely, and the first convex portion 2312 extends to a first end surface 2312a from the first inner surface 2311a along a direction facing the electrode assembly 22, a position on the first body 2311 corresponding to the first convex portion 2312 is formed with a first concave portion 2313 recessed from the first outer surface 2311b along the direction facing the electrode assembly 22, the first concave portion 2313 is configured to accommodate the electrode terminal 232, and the electrode terminal 232 is located on a side of the first end surface 2312a away from the electrode assembly 22.

The related structure of the battery cell 20 manufactured by the above manufacturing device 2000 may refer to the battery cell 20 provided in the above respective embodiments.

It should be noted that, the embodiments in the present application and features in the embodiments may be mutually combined provided that no conflict is caused.

The above embodiments are merely used for illustrating the technical solution of the present application, but are not intended to limit the present application. For those skilled in the art, the present application may have various amendments and modifications. Any modification, equivalent substitution, improvement etc., made within the spirit and principle of the present application shall fall within the protection scope of the present application.

What is claimed is:

1. A battery cell, comprising:
   a housing, comprising an opening;
   an electrode assembly, accommodated in the housing; and
   an end cover assembly, comprising an end cover and an electrode terminal, the end cover being used for covering at the opening, the electrode terminal being installed on the end cover, and being used for electrical connection with the electrode assembly;
   wherein, the end cover comprises a first body and a first convex portion, the first body comprises a first inner surface and a first outer surface arranged oppositely, and the first convex portion extends to a first end surface from the first inner surface along a direction facing the electrode assembly, a position on the first body corresponding to the first convex portion is formed with a first concave portion recessed from the first outer surface along the direction facing the electrode assembly, the first concave portion is configured to accommodate the electrode terminal, and the electrode terminal is located on a side of the first end surface away from the electrode assembly;
   wherein a bottom wall of the first concave portion is provided with a groove recessed along a direction facing the electrode assembly, the electrode terminal is partially accommodated in the groove, and a distance is made to exist between a side wall of the groove and a side wall of the first concave portion in a thickness direction perpendicular to the end cover.

2. The battery cell according to claim 1, wherein a bottom wall of the first concave portion exceeds the first inner surface along the direction facing the electrode assembly; or, the bottom wall of the first concave portion is flush with the first inner surface.

3. The battery cell according to claim 1, wherein the electrode terminal comprises a connection body and a terminal main body, the terminal main body is used for electrical connection with the electrode assembly, and the terminal main body is installed on the end cover through the connection body;
   wherein, the connection body is at least partially accommodated in the groove and fixed to a side wall or a bottom wall of the groove.

4. The battery cell according to claim 1, wherein a depth of the first concave portion is greater than a depth of the groove.

5. The battery cell according to claim 1, wherein the end cover is provided with an electrode extraction hole communicating with the first concave portion and penetrating the first end surface, and the electrode terminal covers the electrode extraction hole.

6. A battery, comprising:
   a box body;
   a battery cell, the battery cell being accommodated in the box body, the battery cell, comprising:
   a housing, comprising an opening;
   an electrode assembly, accommodated in the housing; and
   an end cover assembly, comprising an end cover and an electrode terminal, the end cover being used for covering at the opening, the electrode terminal being installed on the end cover, and being used for electrical connection with the electrode assembly;
   wherein, the end cover comprises a first body and a first convex portion, the first body comprises a first inner surface and a first outer surface arranged oppositely, and the first convex portion extends to a first end surface from the first inner surface along a direction facing the electrode assembly, a position on the first body corresponding to the first convex portion is formed with a first concave portion recessed from the first outer surface along the direction facing the electrode assembly, the first concave portion is configured to accommodate the electrode terminal, and the electrode terminal is located on a side of the first end surface away from the electrode assembly;
   wherein a bottom wall of the first concave portion is provided with a groove recessed along a direction facing the electrode assembly, the electrode terminal is partially accommodated in the groove, and a distance is made to exist between a side wall of the groove and a side wall of the first concave portion in a thickness direction perpendicular to the end cover.

7. The battery according to claim 6, wherein a bottom wall of the first concave portion exceeds the first inner surface along the direction facing the electrode assembly; or, the bottom wall of the first concave portion is flush with the first inner surface.

8. The battery according to claim 6, wherein the electrode terminal comprises a connection body and a terminal main body, the terminal main body is used for electrical connection with the electrode assembly, and the terminal main body is installed on the end cover through the connection body;
   wherein, the connection body is at least partially accommodated in the groove and fixed to a side wall or a bottom wall of the groove.

9. The battery according to claim 6, wherein a depth of the first concave portion is greater than a depth of the groove.

10. A power consumption device, comprising the battery according to claim 6.

11. The battery cell according to claim 1, wherein the end cover assembly further comprises an insulating member;
    the insulating member is located on a side of the end cover facing the electrode assembly, and the insulating member is used for separating the electrode assembly and the end cover.

12. The battery cell according to claim 11, wherein the insulating member comprises a second body and a second concave portion, the second body is located on a side of the first body facing the electrode assembly, the second body comprises a second inner surface and a second outer surface arranged oppositely, the second concave portion is recessed from the second outer surface along a direction facing the electrode assembly, and the second concave portion is configured to accommodate the first convex portion.

13. The battery cell according to claim 12, wherein the second outer surface abuts against the first inner surface.

14. The battery cell according to claim 12, wherein there is a gap between the first end surface and a bottom wall of the second concave portion.

15. The battery cell according to claim 12, wherein a position on the second body corresponding to the second concave portion is formed with a second convex portion, and the second convex portion extends to a second end surface from the second inner surface along the direction facing the electrode assembly.

16. The battery cell according to claim 15, wherein the electrode assembly comprises a tab comprising a first connection portion;
    the battery cell further comprises a current collecting member, the current collecting member comprises a second connection portion for connecting to the first connection portion and a third connection portion for connecting to the electrode terminal;

wherein, the second connection portion and the first connection portion are disposed in a stacking manner along a thickness direction of the end cover, and the third connection portion is located on a side of the second end surface facing the electrode assembly.

17. The battery cell according to claim 16, wherein the insulating member further comprises a third concave portion, the third concave portion is recessed from the second end surface to the second inner surface along a direction away from the electrode assembly, and the third concave portion is configured to accommodate at least a part of the first connection portion and/or at least a part of the second connection portion.

18. The battery cell according to claim 12, wherein the bottom wall of the second concave portion exceeds the second inner surface along a direction facing the electrode assembly.

19. The battery cell according to claim 1, wherein the distance is made to exist between the side wall of the groove and the side wall of the first concave portion in the thickness direction perpendicular to the end cover to facilitate a welding of the electrode terminal and the end cover.

20. The battery according to claim 6, wherein the distance is made to exist between the side wall of the groove and the side wall of the first concave portion in the thickness direction perpendicular to the end cover to facilitate a welding of the electrode terminal and the end cover.

* * * * *